United States Patent [19]

Shaffer

[11] Patent Number: 4,688,828

[45] Date of Patent: Aug. 25, 1987

[54] TUBING JOINT FOR CORROSION PROTECTION

[76] Inventor: Donald U. Shaffer, 2850 E. Coronado St., Anaheim, Calif. 92826

[21] Appl. No.: 847,277

[22] Filed: Apr. 2, 1986

[51] Int. Cl.⁴ ............................................. F16L 55/00
[52] U.S. Cl. ..................................... 285/45; 285/333; 138/DIG. 6; 204/197
[58] Field of Search .......................... 285/45, 333, 334; 138/103, DIG. 6; 204/197, 148

[56] References Cited

U.S. PATENT DOCUMENTS

| | | |
|---|---|---|
| 1,646,735 | 10/1927 | Mills . |
| 1,646,736 | 10/1927 | Mills ................................ 285/45 X |
| 1,705,197 | 3/1929 | Mills .................................... 204/197 |
| 1,814,183 | 7/1931 | Patterson ........................ 285/45 X |
| 2,304,372 | 12/1942 | O'Bannon ...................... 204/148 X |
| 2,392,033 | 1/1946 | Eaton . |
| 2,401,546 | 6/1946 | Brown . |
| 3,251,427 | 5/1966 | Ewing .............................. 204/197 X |
| 3,734,181 | 5/1973 | Shaffer . |
| 3,739,456 | 6/1973 | Scherer et al. ................. 204/197 X |
| 3,891,394 | 6/1975 | Smith et al. . |
| 4,370,211 | 1/1983 | Hybler ............................ 204/197 X |
| 4,487,230 | 12/1984 | Anthony ................. 138/DIG. 6 X |
| 4,544,465 | 10/1985 | March . |

FOREIGN PATENT DOCUMENTS

| | | | |
|---|---|---|---|
| 144450 | 10/1980 | Fed. Rep. of Germany ...... 204/197 |
| 2442280 | 7/1980 | France ................................ 204/197 |
| 16537 | 9/1967 | Japan .................................. 204/197 |

Primary Examiner—Thomas F. Callaghan
Attorney, Agent, or Firm—Poms, Smith, Lande & Rose

[57] ABSTRACT

A tubing joint for the corrosion protection of a production string of metal tubes having one or more annular grooves on the surface of the tube for the inclusion of sacrificial metal rings. Preferably, the metal rings are substantially coincident with the tubing surface.

1 Claim, 7 Drawing Figures

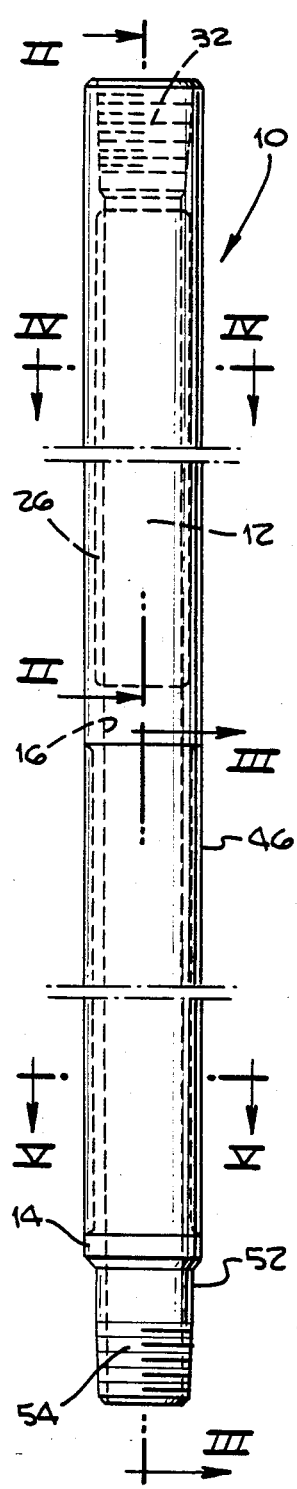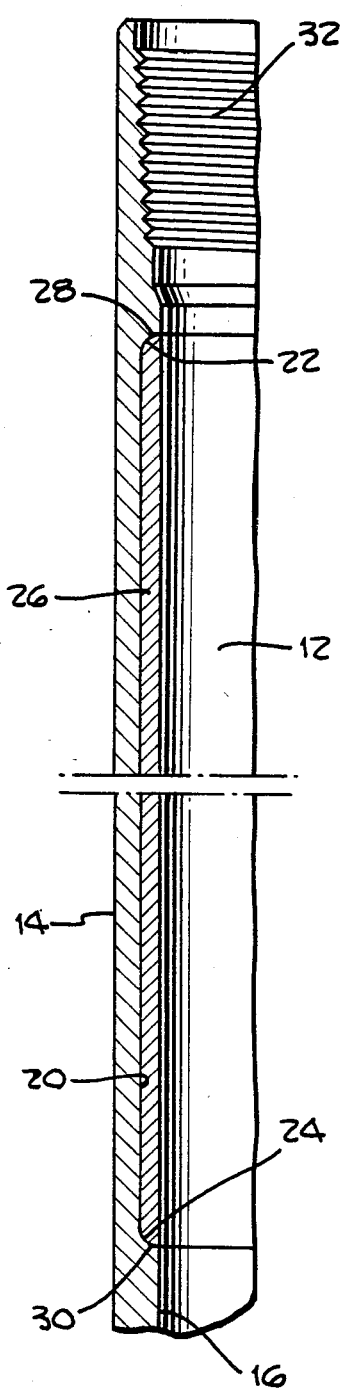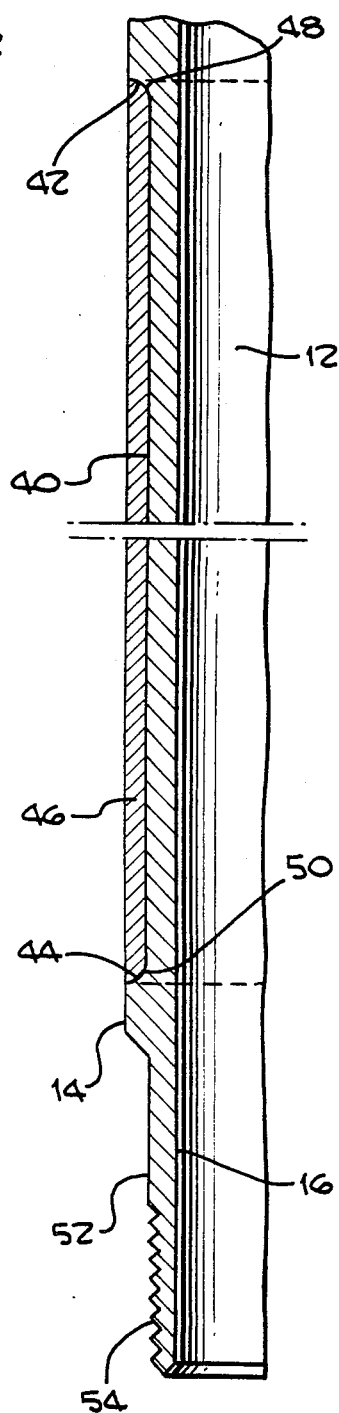

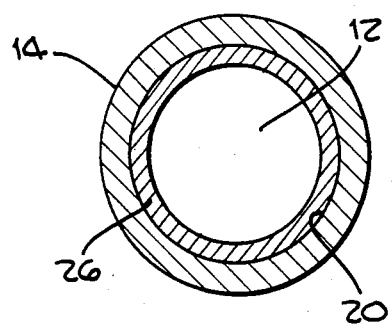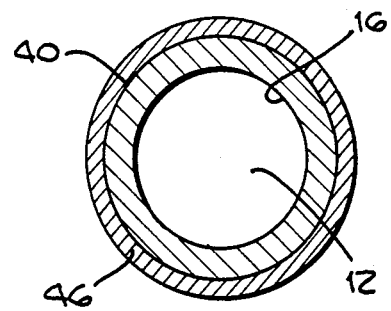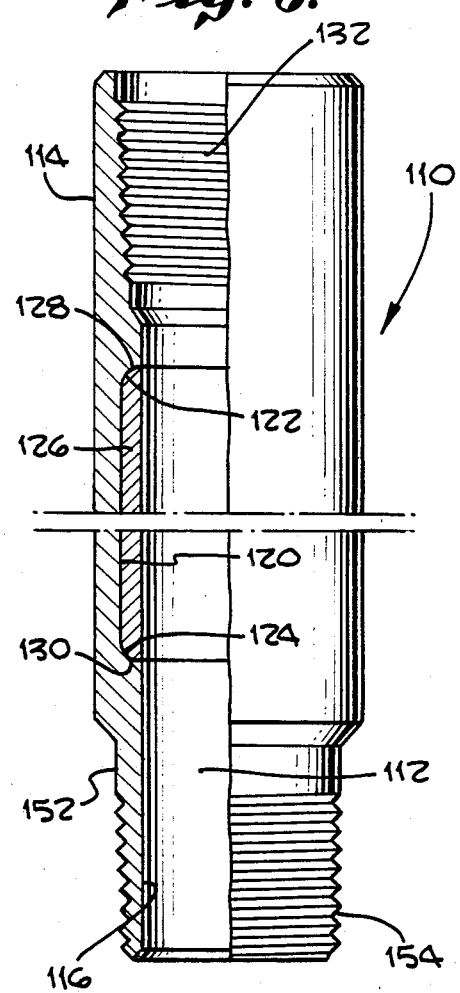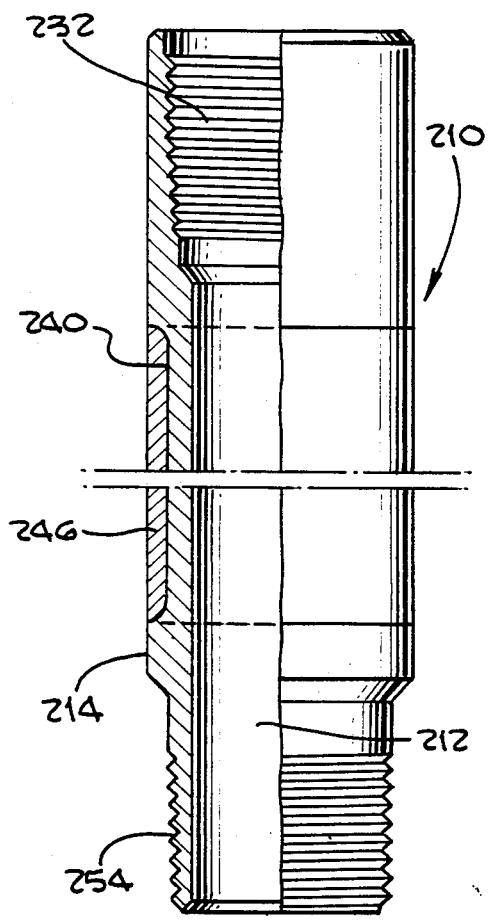

TUBING JOINT FOR CORROSION PROTECTION

BACKGROUND OF THE INVENTION

This invention relates to the use of a device for the corrosion protection of a string of metal tubes. More particularly, the device of this invention will be used as a tubing joint in a production string of tubes or pipes, or casings in oil and gas production wells.

Oil and gas wells typically have corrosion problems because the metal parts, usually iron or steel, are exposed to corroding agents. Ground water generally presents the large corrosive problem. The corrosion-problem is particularly accute in producing oil wells because the components in the well are subjected to corrosive environmental conditions. If the metal tubing and pipes are not replaced before corrosion perforations are formed, then infiltration of water and silt will occur which will affect oil and gas production. It has been found that the corrosion in wells occurs on the inside and outside walls of the casing. Three methods have been used to combat this corrosion. The methods include: coatings; the use of inhibitors; and alloy metals. Coatings have included the use of baked-on phenolics, air-dryed and baked epoxy resins, and galvanizing. Each of these techniques have cost and physical attribute limitations.

Zinc has been used as a corrosion inhibiting agent in several different techniques. An early approach to to corrosion problem is shown in the patent to Mills, U.S. Pat. No. 1,646,736, Electrochemical Means For Preventing Corrosion, where the use of a collar containing zinc is placed in close proximity to the metal surface to be protected. Another technique is shown in the patent to Mills, U.S. Pat. No.1,705,197, Electrochemical Means for Protecting the Interior of Pipes Against Corrosion, where an outer shell of steel encloses an inner casting of zinc. A third technique is shown in the patent to Ewing, U.S. Pat. No. 3,251,427, Protection Of Drill Pipe, where zinc rings are in intimate contact with the external surface of the pipe.

It would be desirable to be able to increase the corrosion protective qualities of the metal production string by using a sacrificial metal which does not project into the bore of the tube or cause any projection or increase in the outside diameter of the tube.

SUMMARY OF THE INVENTION

In accordance with the present invention, a tubing joint is disclosed which provides corrosion protection for a string of metal, iron or steel, tubes using one or more annular grooves in the wall of the tubing joint for the incorporation of sacrificial metal rings in intimate contact with the metal of the tubing joint. Another important feature is that the metal rings will be replaceable after exposure to the corrosive environment. Depending upon the corrosive environment of the production string, the sacrificial metal rings to be incorporated will be located on either the outer surface, inner surface or both surfaces of the tubing joint.

The tubing joint of this invention avoids the need to deform the casing wall to enclose the sacrificial metal, since the sacrificial metal is incorporated in an annular groove of the tubing wall. Also, the tubing wall is of sufficient thickness to withstand the weight of a string of tubes because the depth of the groove is carefully controlled.

A more complete understanding of the tubing joint for corrosion protection of a string of metal tubes in accordance with the present invention, as well as a recognition of additional objects and advantages therefore, will be afforded to those skilled in the art from a consideration of the following detailed description of the exemplary embodiments. Reference will be made to the appended sheets of drawings which will be discussed briefly.

BRIEF DESCRIPTION OF THE DRAWINGS

FIG. 1 shows an elevation view of the exemplary tubing joint in accordance with the present invention.

FIG. 2 is a quarter section taken along plane II—II of FIG. 1.

FIG. 3 is a detailed quarter section taken along plane III—III of FIG. 1.

FIG. 4 is a transverse cross section taken in FIG. 1 along plane IV—IV.

FIG. 5 is a transverse cross section taken in FIG. 1 along plane V—V.

FIG. 6 is an alternative exemplary embodiment of the tubing point showing an internal annular sacrificial metal ring.

FIG. 7 is an alternative exemplary embodiment of the tubing joint showing an external sacrificial metal ring.

DETAILED DESCRIPTION

The exemplary embodiment of the tubing joint for the corrosion protection of a string of metal tubes of the present invention will be described in detail in association with the accompanying drawings. Referring initially to FIGS. 1-5, the preferred exemplary embodiment of the tubing joint 10 for the corrosion protection of a string of metal tubes having an inner surface 16, an outer surface 14, and connecting means 32, 54 at each end permitting the joint to be inserted in a string of metal tubes. A first annular groove or channel 40 on the outer surface 14 is located between the ends of the joint and a first sacrificial metal ring 46 in intimate contact with the first annular groove 40. The longitudinal annular groove 40 makes a smooth transition with the outer surface 14 through the use of annular groove fillets 42, 44. This smooth transition enables the sacrificial metal when cast into the annular groove to form a bonding of high integrity. The sacrificial metal fillets coinciding with the annular groove fillets are 48, 50.

This invention can be used with any number of possible connecting means for inserting the tubing joint in a string of metal tubes. According to the disclosed embodiment, a neck 52 provides the transition from the region containing the sacrificial metal ring to the male threaded member 54 located at one end of the tubing joint. A female threaded member 32 is located at the opposite end of the tubing joint from the male threaded member 54.

In order to facilitate the insertion of the production string into a well, it is highly desirable that the sacrificial metal ring 46 does not project beyond the outer surface 14. While it is conceivable that in certain applications the sacrificial metal ring may only partially fill the annular groove on the outer surface, in order to have the maximum benefit of use of the tubing joint when the outer surface of the sacrificial metal ring 46 is substantially coincident with the outer surface 14 of the tubing joint.

While larger quantities of sacrificial metal will increase the period of time each joint will be able to be used, it has been found that a groove depth of not exceeding 60% of the thickness of the tubing joint provides a good balance between the corrosive resistent qualities and the thickness of undisturbed metal needed in order to have satisfactory strength characteristics.

In the exemplary preferred embodiment, a second annular groove 20 is on the inner surface 16 in a spaced relationship with the first annular groove 40 and the ends of the tubing joint. A second sacrificial metal ring 26 is in intimate contact with the spaced annular groove 20. The longitudinal annular groove 20 makes a smooth transition with the inner surface 16 through the use of annular groove fillets 22, 24. This smooth transition enables the sacrificial metal ring 26 when cast into the annular groove to form a bonding of high integrity. The sacrificial metal fillets corresponding with the annular groove fillets are 28, 30.

It is envisioned that the second sacrificial metal ring 26 outer surface will be substantially coincident with the inner surface 16 of the tubing joint. Projections of the sacrificial metal ring 26 into the bore 12 of the tubing joint are not desirable because such projections may interfere with the oil or gas pumping equipment. It is envisioned that in certain situations, the second sacrificial metal ring located on the inner surface 16 may not completely fill the annular groove 20. This situation may arise when the corrosive environment experienced on the bore of the production string is not as severe as that experienced on the production string exterior.

FIG. 4, a transverse cross section along plane IV—IV discloses the bore 12 being enclosed by the sacrificial metal ring which is further enclosed by wall of the tubing joint.

FIG. 5, a transverse cross section taken along plane V—V in FIG. 1 discloses the sacrificial metal ring surrounding the tubing joint.

As it can be appreciated by those who are skilled in the art, the dimensions of the tubing joint will be largely determined by the dimensions of the production string, application, and environment. As a matter of practice, a 39 inch tubing joint permits the first sacrificial metal ring located on the outer surface and the second sacrificial metal ring located on the inner surface to have a longitudinally extending length of up to 15 inches. The thickness of the annular rings are approximately ¼ inch. The longitudinal distance between the first and second sacrificial metal rings is approximately 2 inches. A sufficient longitudinal distance is required between the two rings in order to avoid any stress concentration which could result in a failure of the tubing joint. According to the exemplary embodiment, the sacrificial metal rings will be cast zinc metal.

An alternative exemplary embodiment of the tubing joint for the corrosion protection of a string of metal tubes is shown at FIG. 6. With similar or corresponding elements enumerated with numbers as in the first preferred embodiment, plus one hundred. This preferred embodiment differs from the first embodiment in that a single sacrificial metal ring is located on the inner surface 116 of the tubing joint 110. Annular groove 120 has associated with it fillets 122, 124. The sacrificial metal ring 126 is associated with fillets 128, 130. Outer surface 114 makes a smooth transition to neck 152 which joins male threaded member 154 at one end. Female threaded member 132 is disclosed at the other end of the other end of the tubing joint. According to this exemplary embodiment, the sacrificial metal ring will be zinc.

The dimensions of a tubing joint containing one sacrificial metal ring will be largely determined by the dimensions of the production string, application, and environment. As a matter of practice, a 24 inch tubing joint permits an approximately 16 inch sacrificial metal ring with an approximate thickness of ¼ inch.

An alternative exemplary preferred embodiment of the present invention is illustrated in FIG. 7 with similar or corresponding elements enumerated with numbers as in the first preferred embodiment plus 200. This preferred embodiment differs from the second alternative preferred embodiment because a single annular groove is located on the outer surface of the tubing joint 210. The annular groove 240 is located on the outer surface 214. Sacrificial metal ring 246 is in intimate contact with the annular groove 240. A female threaded member 232 is located at one end of the tubing joint. At the other end of the tubing joint is a male threaded member 254.

The actual dimensions of the tubing joint of this embodiment will be dependent upon a particular application and environment of use. In a typical application, a 24 inch tubing joint permitted a 14 inch sacrificial metal ring with a thickness of ¼ inch. It would be possible to also have a sacrificial metal ring in a dimension greater than 14 inches in length for this size application. According to this exemplary embodiment, the sacrificial metal ring will be zinc.

Having thus described exemplary embodiments of the present invention, it should be noted by those skilled in the art that the within disclosures are exemplary only and that various other alternatives, adaptations and modifications may be made within the scope of the present invention which is defined and limited as defined by the following claims.

I claim:

1. A tubing joint for use in a well casing to provide connection between a string of metal tubes and said joint, said joint having an inner surface, and an outer surface, wherein the improvement comprises:
   a first annular groove on said inner surface located between the ends of said joint having a depth not exceeding sixty percent of the thickness of the tubing joint;
   a first sacrificial metal ring in intimate contact with said first annular groove having an inner surface substantially coincident with said inner surface of said tubing joint;
   a second annular groove on said outer surface in spaced relationship with said first annular groove and the ends of said joint; and
   a second sacrificial metal ring in intimate contact with said second annular groove;
   a connecting means located at each end of said joint for connecting said joint to a string of metal tubes on each side of said joint; and
   an annular region in a spaced relationship between each end of said sacrificial metal ring and said connecting means undisturbed by said sacrificial metal ring and said connecting means,
   whereby said joint provides corrosion protection for the string of metal tubes connected so said joint.

* * * * *